Figure 2:
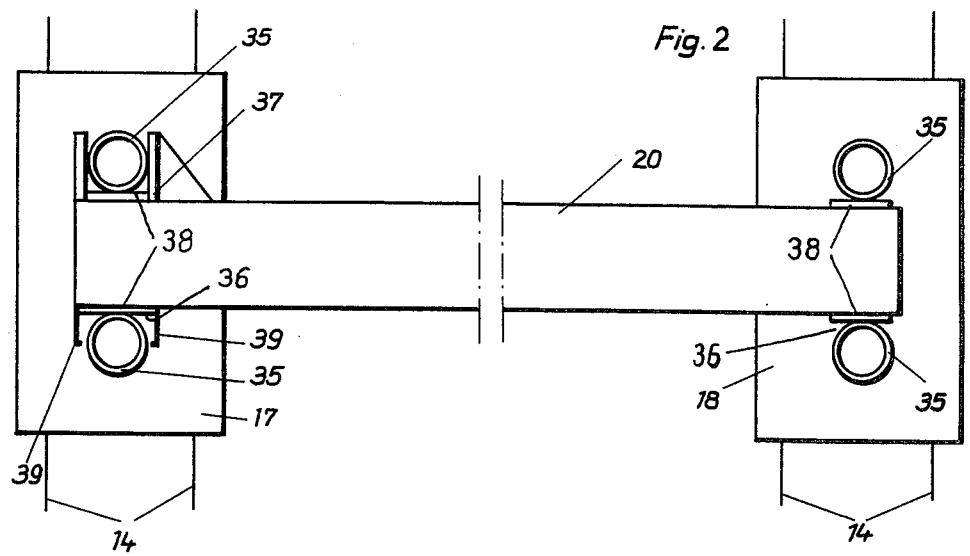

United States Patent [19]

Fischer

[11] 4,121,724
[45] Oct. 24, 1978

[54] APPARATUS FOR REMOVING BULK MATERIAL FROM A DUMP OR STOCKPILE

[75] Inventor: Gerhard Fischer, Dortmund-Kirchhorde, Fed. Rep. of Germany

[73] Assignee: Gustav Schade Maschinenfabrik, Dortmund, Fed. Rep. of Germany

[21] Appl. No.: 760,055

[22] Filed: Jan. 17, 1977

[30] Foreign Application Priority Data

Jan. 17, 1976 [DE] Fed. Rep. of Germany ....... 2601592

[51] Int. Cl.² .............................................. B65G 65/28
[52] U.S. Cl. ..................................... 214/10; 198/508; 198/516; 198/519
[58] Field of Search .................... 214/10, 16 R, 1 R; 198/508, 509, 510, 511, 516, 518, 519, 520, 585, 586, 725, 727, 728, 732, 862; 37/191 A, 192 A

[56] References Cited

U.S. PATENT DOCUMENTS

| 2,797,823 | 7/1957 | Huntzinger | 214/10 |
| 3,604,572 | 9/1971 | Strocker | 214/10 |
| 3,621,978 | 11/1971 | Smith | 214/10 X |
| 3,704,796 | 12/1972 | Dedons et al. | 214/14 |
| 3,708,056 | 1/1973 | Ströcker | 214/10 X |
| 3,814,268 | 6/1974 | Fischer et al. | 214/10 |

FOREIGN PATENT DOCUMENTS

| 705,790 | 3/1931 | France | 214/16 R |
| 723,851 | 1/1932 | France | 214/10 |

Primary Examiner—Frank E. Werner

[57] ABSTRACT

Apparatus for progressively removing bulk material from a dump or stockpile having a generally trapezoidal cross-section includes a gantry having a bridging girder extending between a pair of upright end supports. At least one of the supports is movable along a track extending alongside or around the base of the dump or pile. The gantry supports scraper means for scraping material from the top of the pile, and the scraper means together with the girder can be jointly raised or lowered between the upright end supports. Each upright end support includes guide means which laterally retain the girder perpendicular to its longitudinal axis while permitting free vertical movement of the girder.

19 Claims, 14 Drawing Figures

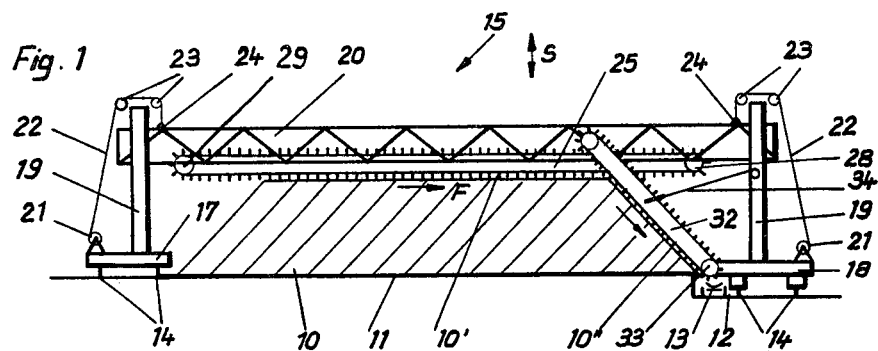
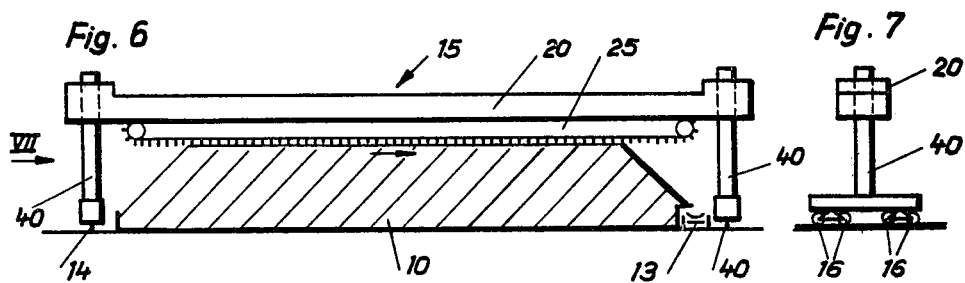
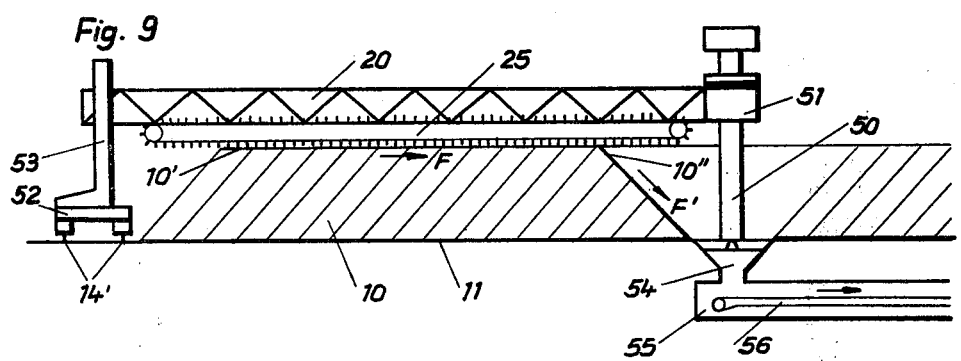

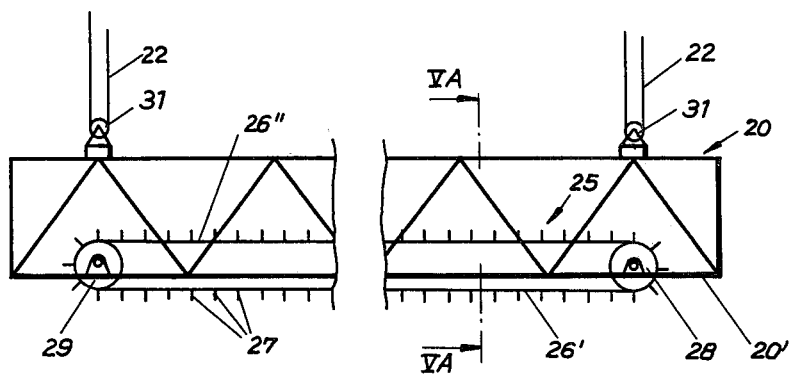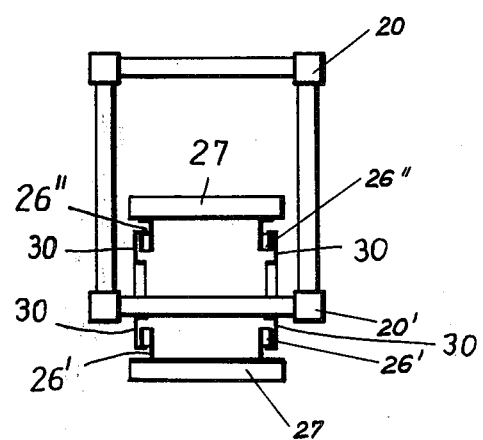

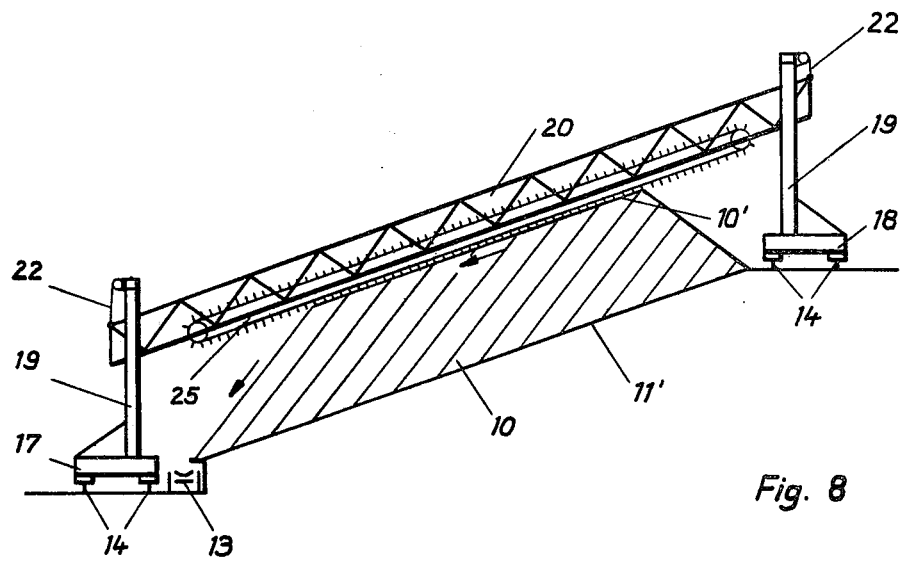
Fig. 8
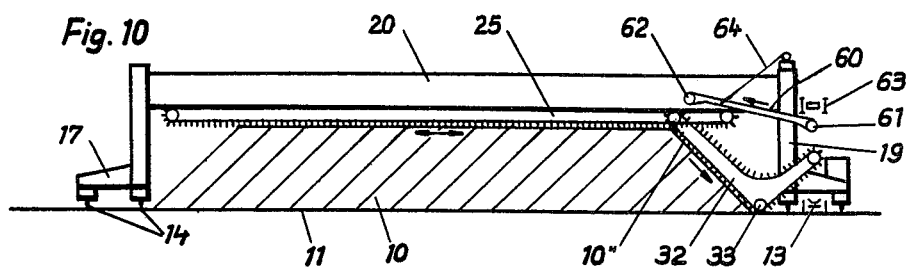
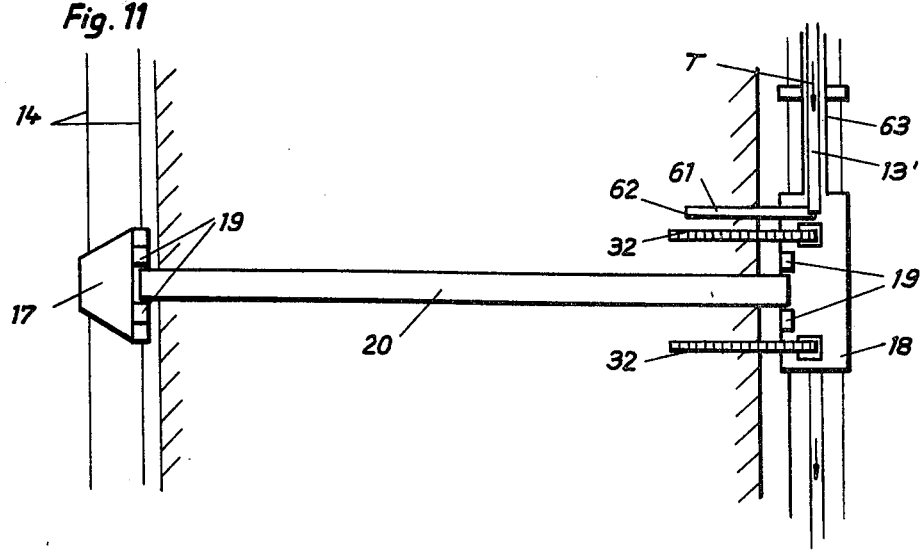

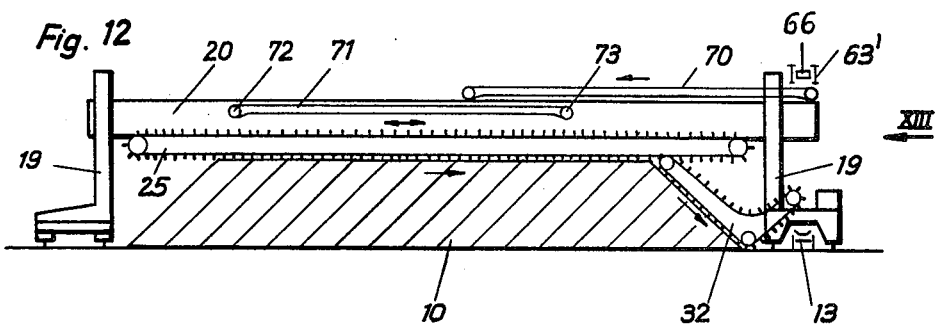
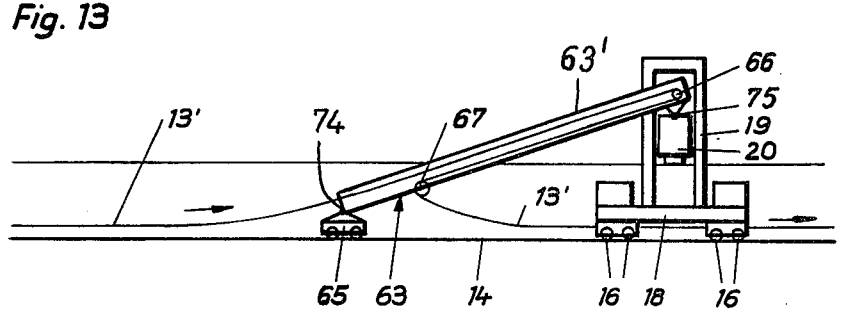

APPARATUS FOR REMOVING BULK MATERIAL FROM A DUMP OR STOCKPILE

This invention relates to apparatus for progressively removing bulk material from a dump or stockpile, in particular from piles with a generally trapoezoidal cross-section.

One such device in the form of a gantry scraper is already known and is described in U.S. Pat. Nos. 3,814,268 and 3,708,056. The device includes a gantry bridge spanning the dump pile and travelling on rails alongside the dump. The gantry includes one or more scraper booms spanning the pile and suspended between the upright supports of the bridge. The bulk material is scraped from the top of a generally trapezoidal pile by scraping elements carried on the scraper boom or booms, and movement of the material down the angled sides of the pile may be assisted by a pile slope clearing appliance. It is then transferred to a conveyor, preferably a fixed storage-yard belt. Since both ends of the scraper boom carrying the lateral forces arising in operation abut the gantry, the bending loads acting on the scraper boom are greatly reduced, and the scraper may be made fairly long to span the dump or stockpile without incurring prohibitive building costs.

Clearly the size and weight of the gantry and scraper boom increase with the width of the dump or stockpile. Since the gantry must be especially rigid and stable, it is unavoidably heavy. This high weight of the gantry structure, together with long scraper lengths impose a requirement for powerful travel drives, stable tracks and a firm track understructure to carry the high loads. Non-synchronised operation of the gantry travel drives, or an inaccurate track alignment, develop considerable distorting forces in the gantry and hence extremely high horizontal stresses in the track rails. To limit these horizontal loads the rails must be laid very accurately and maintained in this condition.

When known gantry scrapers are provided with a feed device for feeding bulk material into the dump, (for example with a distribution and discharge belt mounted on a bridge girder of the gantry) the bulk material is dumped upon the stockpile from a considerable height. With dry bulk materials this causes excessive dusting and often an undesirable grain comminution.

In accordance with the present invention, apparatus for progressively removing bulk material from a dump or stockpile having a generally trapezoidal cross-section comprises a gantry having a girder extending between a pair of vertical supports, at least one of the supports being movable along a track extending along or around the base of the dump or stockpile, means supported by the gantry for scraping material from the top of the pile, and means for jointly raising or lowering the scraper means and the girder between the vertical supports, each vertical support including guide means which permit free vertical movement of the girder but laterally retain the girder perpendicular to its longitudinal axis.

The girder and the scraper means are preferably jointly raised or lowered as a single structure and this therefore eliminates the need for a separate scraper boom. The whole structure is consequently simplified and is therefore much lighter. It thus becomes possible to construct a gantry at a reasonable cost to economically clear very wide dumps or stockpiles, particularly stockpiles having a trapezoidal cross-section.

Where the bridge girder and scraper boom are combined into a common structure so that the bridge girder now performs the function of the scraper boom, the scraper means may comprise scraper blades spaced along an endless chain, the driving and return chain sprockets and guides being mounted on the bridge girder. In particular the chain may travel along its upper run above the bottom surface of the bridge girder whereas on its lower run when the blades engage the bulk material, the chain may travel along a path parallel to the top of the stockpile and beneath the bottom surface of the girder.

Preferably, the girder is guided in the respective vertical supports with a clearance enabling it to swing in the horizontal and/or vertical planes, and thereby allow a certain skew in the bridge position. This articulation eliminates possible torques upon the supports which would otherwise cause additional stresses, particularly horizontal forces on the track or tracks along which the supports are movable. In this respect, it is particularly advantageous to support the bridge girder at one end against longitudinal movement while allowing the other end of the girder to slide longitudinally in its support so that any skew of the overall bridge structure and/or changes in the distance between the supports, are withstood, within limits, without causing harmful distortions or warping of the bridge structure.

The apparatus can be used on an uneven or inclined base. For example, the vertical supports may travel along rails laid on both sides of the dump or stockpile at different levels. When the dump or stockpile is built up on sloping ground, the bridge girder can be mounted obliquely with its longitudinal axis forming an acute angle with the horizontal, and the girder can then be lifted or lowered in this position.

The bridge girder is conveniently slot guided at both vertical supports. The slots may be provided either in the supports or at the respective ends of the girder. Each support may for instance comprise two tubular columns, the space between the columns forming a guide slot. The bridge girder is then preferably provided at one end with a fork shaped guide assembly receiving one or both tubular columns to provide both lateral and longitudinal guiding of the bridge girder. At the opposite end, the bridge girder may be slidable between the tubular columns in both vertical and horizontal directions. This affords, within the clearance range, swing movements in all planes.

The apparatus is suited for removing bulk materials stored in longitudinal, circular or annular dump or stockpiles. In the former case, the layout is preferably chosen so that both vertical supports are supported on bogies and guided by either one rail laid along each side of the stockpile at its base or, preferably, by two parallel rails each side of the pile. When the apparatus is used for clearing circular or annular stockpiles, one vertical support constitutes a column in the centre of the stockpile, and the girder is slidable up and down this central column as well as being able to pivot about the vertical centre line.

In addition, the apparatus can, if desired, be used for building-up a dump. Because the bridge girder may be lifted and lowered as desired, the bulk material can be spread over the pile from small dumping heights by a discharge unit mounted on the girder, and therefore without excessive dusting and without causing comminution of the grains by impact.

It is also possible to mount on one vertical support of the bridge girder a feed conveyor adjustable in height or moving in the vertical direction for discharging bulk material onto the stockpile. In this case, the clearing scraper may also serve to distribute the discharged material evenly over the whole stockpile width.

Figure 3:
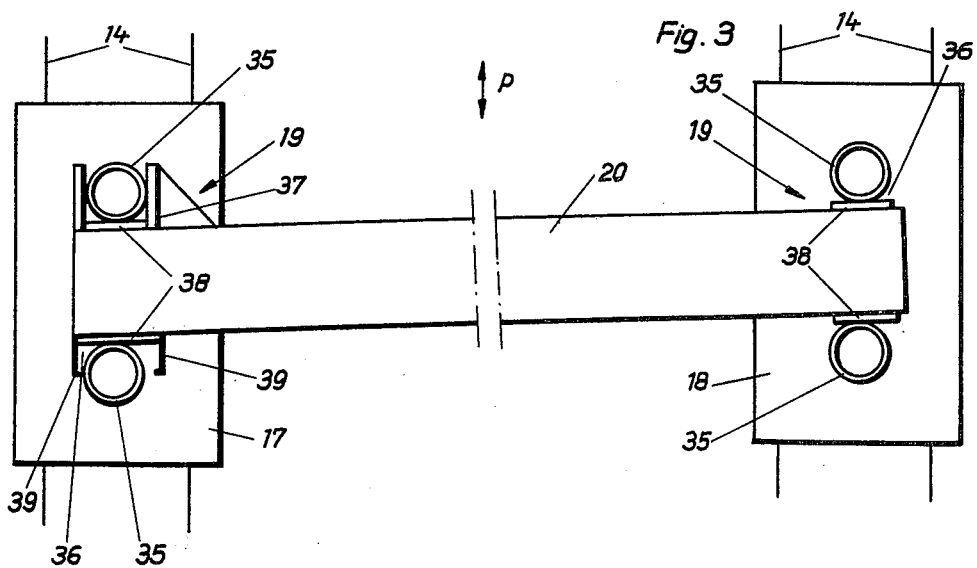
Figure 4:
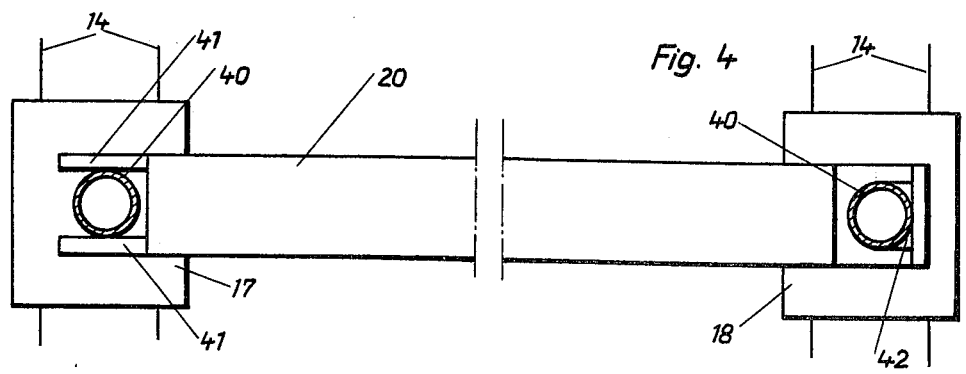

For a clearer understanding of the invention, several embodiments will now be described with reference to the accompanying drawings wherein:

FIG. 1 is a diagrammatic section across a trapezoidal stockpile with a gantry scraper for bulk materials embodying the invention shown in sideview, FIGS. 2 and 3 show the gantry scraper of FIG. 1 diagrammatically in plan view, FIG. 4 is a horizontal section through one of the support towers in an alternative gantry scraper embodying the invention, FIG. 5 is a diagrammatic side view of the bridge girder and clearing scraper of a gantry scraper embodying the invention, FIG. 5A is a cross-sectional view along line Va—Va in FIG. 5, FIG. 6 is a sideview of another gantry scraper embodying the invention, FIG. 7 is a view along arrow VII in FIG. 6, FIG. 8 is a sideview of yet another gantry scraper embodying the invention, FIG. 9 is a sideview of a gantry scraper embodying the invention used for clearing a circular dump, FIGS. 10 and 11 are a diagrammatic side and plan view of another gantry scraper embodying the invention provided with a stockpile filling device, FIG. 12 shows the gantry scraper embodying the invention with a stockpile filling device mounted on a common bridge girder, and FIG. 13 is a view along arrow XIII in FIG. 12.

The same reference numerals are used to identify like parts in the different figures of the drawings. Common to several of the figures is a stockpile 10 with a generally trapezoidal cross-section built-up of bulk material on the floor 11 of a storage yard as a rectangular dump. A channel 12 carries a transporter belt 13 along one longitudinal side of the stockpile 10 and conveys material cleared from the top of the stockpile away from the stockpile.

Rail tracks 14 are laid along both sides of the stockpile 10 for the bogie wheels 16 of a gantry bridge 15 so that the bridge can travel along the length of stockpile 10 in both directions.

In FIGS. 1 to 3, two parallel rails 14 are laid along each side of the stockpile for the respective bogies 17, 18. The travelling bogies 17, 18 are each driven independently. As seen in FIG. 1 the bogies carry vertical support towers 19, and a bridge girder 20 extending between these towers spanning the whole stockpile width.

The bridge girder 20 consists of a framework beam trussed for rigidity. It can be raised or lowered as shown by arrow S, and is thus provided with a winch 21. Its rope 22 passes over a pulley 23 at the top end of the associated tower 19 and is fixed at 24 to the appropriate end of the bridge girder 20. By simultaneously winding on or off both winch ropes 22 the bridge girder 20 may be raised or lowered in its approximately horizontal position. If desired, the girder 20 may be raised or lowered at an angle to the horizontal by unequal winding on or off of the respective winch ropes 22.

A clearing scraper 25 is mounted on the bridge girder 20 and extends substantially parallel to the bridge girder over the whole width of the stockpile 10. As shown in particular in FIGS. 5 and 5A, the clearing scraper comprises two parallel endless, flat-link chains 26 connected at intervals to flights or blades 27. Both endless chains 26 are driven and returned by guiding and driving sprockets 28, 29 mounted inside the bridge girder 20 just above the bottom surface of the girder in such a manner that the lower run 26 of the chain travels just under the bottom of the girder and parallel thereto, whereas the unloaded return run 26 travels just inside the girder. Side guides 30 for the chains are mounted on the girder. FIG. 5 also shows the winding ropes 22 running in pulleys 31 mounted on the girder.

When a layer of the bulk material is to be cleared from the top of the stockpile 10, bridge 15 first travels along the rail tracks 13 to one end of the pile (in direction of arrow P in FIGS. 2 and 3). The girder 20 is then lowered by winch 21 until the bottom chain 26 of scraper 25 rests on the top of the stockpile 10. The blades 27 are thus at least partially immersed in the material of the pile and when the chains are driven a layer of material is scraped from the top of the pile towards the pile side wall 10 in direction of arrow F. The cleared bulk material then slides by gravity along the pile slope 10 down to the belt in the storage yard on which it is transported away from the stockpile. During clearance of the bulk material, the bridge is continuously moved by bogies 17, 18 along the pile 10. When the scraper 25 reaches the other end of the pile, it is lowered (jointly with bridge girder 20) by an amount equal to the cutting depth of blades 27, and the bridge is then moved in the opposite direction back over the pile to clear away another layer of the material. This sequence is repeated until the whole of the stockpile is cleared.

To assist and accelerate the sliding movement of the bulk material down the slope 10, a side clearing appliance may be provided as shown in FIG. 1. This appliance consists of two parallel associated scrapers 32 pivotably arranged on both sides of the clearing scraper 25 and mounted in pivot bearings 33 on the travelling tower 18 near the pile base.

Their slope is varied by a lifting device such as a rope 34. Both auxiliary scrapers 32 serving to move the material down the slope of the stockpile are generally mounted at an angle approximately corresponding to the natural angle of repose of the material kept on the stockpile 10. Provision of two auxiliary scrapers 32 is by itself already known from DT-PS 2,005,147.

It is understood that the auxiliary scrapers 32 convey the material moved to within their reach by the cleaning scraper 25 and then assist in moving it down the pile slope 10 to the yard belt 13. Generally, only the auxiliary scraper positioned in the direction of travel behind the clearing scraper 25 is operated. The auxiliary scrapers generally maintain their inclined position during the whole cleaning process.

Positioning and guiding of the bridge girder 20 on both its support towers is shown in FIGS. 2 and 3. Each support tower 19 (FIG. 1) consists of two vertical, tubular support columns 35 spaced apart on bogies 17, 18 by a distance approximately equal to the width of the girder 20. A guiding recess 36 is thereby formed between the columns 35. A fork shaped guide assembly 37 is mounted laterally at one end of the bridge girder to accommodate the columns 35. The girder 20 is then guided for movement in the vertical direction but is constrained against movement in the axial direction. The guide assembly 37 forms an articulated joint with its axis coinciding with the longitudinal axis of the associated tubular columns. The other end of the bridge girder fits loosely between the columns 35 of the travelling tower 18 so that the girder is movable both vertically and (within the play provided) also longitudinally in its guiding recess 36. A swinging movement of the girder 20 in all spatial planes is possible within the guiding recesses 36 due to the clearances provided. Wear resisting slide plates 38 are mounted against both sides of girder 20 to bear against the columns 35.

The girder 20 is mounted perpendicular to the longitudinal stock pile axis or rail tracks 14 as shown in FIG. 2. Any variation in the distance between the two rails 14 along both sides of the stockpile is compensated by a corresponding longitudinal movement of the girder 20 relative to columns 35 on the travelling bogies 18. Changes in height or slope of the rails are compensated without developing torques by the articulated joint provided by the guiding clearances between the girder and the support columns.

When movements of the travelling towers 17, 18 of the bridge are not precisely synchronised, one or the other tower will be leading in direction of arrow P; the bridge girder 20 then pivots in its articulated joint with the fork shaped guide assembly 37 to compensate for the relative displacement of the two towers. The girder thus lies skew to the rails 14 and when this skew exceeds a preset value, a feeler or contact 39 of guide assembly 37 is actuated by an end stop on the circular column 35 mounted on the opposite side of the bridge girder to the guide assembly 37. The feeler or contact 39 adjusts the drive of the lagging or leading bogie 17, 18 to resume synchronism so that the girder 20 is returned from the position shown in FIG. 3 to the normal position shown in FIG. 2. As shown, either one of two keys or contacts 39 is actuated by a respective stop or contact on column 35 depending on the skew of the bridge girder so that the necessary corrective action is initiated. Devices such as switches or transmitters may be used with the feelers or contacts 39.

FIG. 4 shows an alternative arrangement for guiding the bridge girder 20 within the travelling towers 19. In this case, both towers have only one support 40 consisting of a tubular column. For the tower supported on bogie 17 the girder 20 is provided with a fork guide assembly 41 embracing support column 40, the forked guide abutting laterally against support 40 so that the girder is able to turn about the vertical axis of support 40 in a horizontal plane. The girder is also able to swing in a vertical plane and to slide up and down the column 40. At its opposite end the girder 20 is provided with a recess 42 which receives the tubular support 40. In this case also, the girder 20 laterally abuts support 40 but is articulately movable about the vertical axis of the support and retains articulation in all other spatial directions within the guide assembly clearances. In its function the arrangement of FIG. 4 is identical with the one shown in FIGS. 2 and 3. It is understood that the embodiment of FIG. 4 also uses devices such as contacts and feelers for maintaining alignment of the bridge.

The alternative example illustrated in FIGS. 6 and 7 differs from FIG. 1 inter alia by omitting the scraper for moving the material down the stockpile slope 32 and in that bridge 15 of the clearing scraper is supported and guided on both sides of the trapezoidal stockpile 10 by one rail 14 only. As in FIG. 1, bridge girder 20 is vertically guided and supported by its columns 40 and at least one of the two support columns affords articulated movement in the vertical plane between the support column and the bridge girder to ensure full stability of the bridge. Girder 20 may also be provided at one end with a vertical guide bush enclosing the support column with quite a small clearance. Alternatively, other guiding assemblies may be used affording articulated movement only in the horizontal plane.

In FIGS. 6 and 7 the lifting device on both support columns 40 is not shown. It may however consist of winches 21, as in FIG. 1, or of other appliances such as lifting cylinders.

FIG. 8 illustrates a bulk material gantry scraper of substantially the same design as that of FIG. 1. The trapezoidal stockpile 10 is in this case heaped on the floor 11 of an inclined storage yard. Therefore, the rail tracks 14 at both stock pile sides 10 are at different levels. The static yard belt 13 is located alongside the rail track 14 at the lower level for the bogie 17. In this layout the oblique bridge girder 20 with its clearing scraper 25 is adjusted in height by lifting gears. The girder lies at an angle to the horizontal approximately equal to the slope angle of the dump surface 10. This inclination is maintained as the girder is raised or lowered. The bridge girder 20 is guided and supported along both vertical columns but is otherwise identical with FIGS. 2, 3 and 4. Also in this arrangement as associated scraper may be used along the stockpile slope.

FIG. 9 shows a bulk material gantry scraper intended for clearing a circular stockpile 10. One of the two support towers is built as a fixed column 50 in the centre of the circular dump upon the yarn floor 11. The bridge girder 20 is again provided with a clearing scraper 25 and up to this point the layout is the same as in FIG. 1. The bridge girder 20 is guided vertically at one support end 51 along the fixed column 50 and can swing about the vertical axis of this support. Around the boundary perimeter of the circular stockpile two circular centre rails 14 are laid with their centre coinciding with the support column axis 50. Bogie 52 supporting a travelling tower runs on these rails. This tower consists of a vertical support column 53 on which the outer, non-anchored end of the girder may slide in vertical direction and is preferably articulately supported. It is understood that both support columns 50, 53 are provided with lifting gears of the described type to raise and lower the bridge girder 20 with its clearing scraper. In use, the girder 20 with scraper 25 swings around the fixed support column 50. The scraper scrapes the bulk material along the pile surface 10 in the direction of arrow F towards the annular pile slope 10. The bulk material slides by gravity in direction of arrow F down the pile slope 10 into a bin with a discharge above a belt 56 movable in a channel 55. The belt conveys the material away from the stockpile area.

In FIGS. 10 and 11 a bulk material gantry scraper is shown which is similar to that shown in FIG. 1. It differs in that it is additionally provided with a stockpile filling appliance 60. The latter consists of supply belt 61 with a discharge end mounted on one vertical support 19 and swingable in the vertical direction. The top belt traverse of the fixed yard belt conveyer 13 passes repeatedly through a belt loop trolley 63 in a known manner and is arranged to discharge the incoming material travelling in the direction of arrow T onto the supply belt 61 and then onto the transfer point 62 whence it is dumped onto the stockpile. Scraper 25 is reversible as indicated by the double-arrow in FIG. 10 and when the chains are operated in the opposite direction the material discharged from the supply belt 61 is distributed over the yard floor 11. In this way the trapezoidal stockpile is built-up. The two auxiliary scrapers 32 mounted on each side of the bridge girder 20 and belonging to the pile side slope clearing appliance are laid out for this purpose in such a manner that the loose material sliding downwards along the slope 10" is conveyed upwards about the pivot bearing 33 along a chute and discharged at the top of the stockpile upon the top belt traverse of the yard conveyer 13 behind the belt loop trolley. It can be seen from FIG. 11 that the supply belt 61 is mounted at a certain distance from the bridge girder 20 and the adjacent auxiliary scraper 32. The supply belt is mounted so that it can swing in the vertical plane on the support 19. Its inclination is adjusted by a swing drive, shown as a winch with a winding drum 64, and this serves to control the discharge height from the supply belt. The material is thus discharged onto the stockpile from any desired dumping height.

FIGS. 12 and 13 illustrate the gantry of FIGS. 10 and 11 provided with another device for supplying material onto the stockpile. This consists of a supply belt 70 fixed to bridge girder 20 and extending from one end of the girder to about its middle. Under supply belt 70 a reversible distribution and discharge band 71 is provided running along the girder 20. Material to be spread on the stockpile is supplied as shown in FIG. 13 by a belt loop trolley 63 supported and guided on trolley 65 along one side of the pile on rails 14. The trolley is provided with jib 63 abutting articulately at one end 74 against the trolley 65 and coupled at its other end articulately with the bridge girder 20. The trolley 65 thus follows all movements of the girder 20 vertically and contrains lateral movement. The belt 13 of the stationary yard conveyer 13 runs (as shown by the arrow) upwards in the jib and returns over the top drum 66 back to ground level. The material is then discharged at the return drum 66 onto the supply belt 70. The top belt 13 returns into its normal position over return drum 67. The bulk material carried by belt 70 is discharged onto the distribution and supply belt 71 which depending on the direction of its travel dumps the material onto the stockpile either at its end 72 or at its opposite end 73. Since belt 71 travels longitudinally along the bridge girder 20 the stockpile is built-up with a regular trapezoidal cross-section 10. Since both belts 70 and 71 are mounted on the bridge girder 20 which itself travels upwards and downwards along the supports 19 the material falls onto the stockpile from an adjustable height.

The guiding and support assembly for vertical movement of the bridge girder 20 along the supports may be arranged with either slide or roller guiding. In either case the bridge girder 20 is laterally supported at both ends in these supports. It is recommended to use for one or both supports a loose bearing which affords a slight longitudinal movement of the bridge girder in relation to the support. Both bearings are preferably designed to that limited movement of the girder is permitted in the horizontal plane and/or a limited articulated movement in the vertical plane; this serves to compensate for deivations in the spacing and/or in height of the rails 14 and/or oblique movement of the bridge girder due to a not fully synchronised travel of both travelling towers on their bogies.

It is possible to mount several clearing scrapers on the bridge girder of a travelling bridge. Particularly advantageous is an arrangement in which two clearing scrapers are provided on the bridge girder, each with a length about half the length of the bridge girder; one of these scrapers extends to the left from the central part of the bridge girder whereas the other extends to the right. The two scrapers then remove the material in opposite directions. This arrangement enables removal of considerable volumes from the pile. Since the scrapers travel in opposite directions there is the additional advantage that chain stresses of the scrapers transmitted to the bridge girder are to a large extent cancelled out.

With this layout of clearance scrapers it is recommended to install a static yard belt on both sides of the pile to remove the withdrawn material. Side clearing scrapers of the above described type along both side slopes of the trapezoidal pile may be used.

I claim:

1. Apparatus for progressively removing bulk material from a dump or stockpile having a generally trapezoidal cross-section and a straight or annular axis, the apparatus comprising: a gantry having a bridging girder spanning the dump or stockpile and extending between a pair of end support structures, at least one of said support structures being movable along a track extending alongside the base of said dump or stockpile so that, in operation, said gantry may move in the direction of said axis and substantially transverse to said bridging girder; scraper means supported by said gantry for scraping bulk material from the top of said dump or stockpile in the longitudinal direction of said bridging girder, said scraper means including an endless scraper chain assembly driven by and about driving and return sprocket means mounted on said bridging girder; means for jointly raising or lowering said scraper means and said bridging girder as a single structure with respect to said support structures; each said support structure including guide means which laterally support and guide said bridging girder perpendicular to its longitudinal axis while permitting free vertical movement of said bridging girder; a first of said support structures including means for supporting the bridging girder at its adjacent end against movement in its longitudinal direction, whereas the guide means at the other support structure permits longitudinal movement of said bridging girder.

2. Apparatus as claimed in claim 1 wherein said bridging girder is mounted at both said support structures for pivoting in a vertical plane with respect to said support structures.

3. Apparatus as claimed in claim 1 wherein said bridging girder is mounted at both said support structures for pivoting in a horizontal plane with respect to said support structures.

4. Apparatus according to claim 1 in which said endless scraper chain assembly includes an upper run above the bottom surface of said girder and a lower run beneath said girder for scraping a layer of said bulk material from the top of the pile.

5. Apparatus according to claim 1 in which said guide means includes guide recesses or slots.

6. Apparatus according to claim 5 in which said guide recess or slot is formed between two tubular columns.

7. Apparatus according to claim 6 in which said bridging girder is provided at one end with a generally fork-shaped guide assembly for receiving one of said two tubular columns.

8. Apparatus according to claim 1 in which each of said end support structures includes a bogey which travels on a respective said track.

9. Apparatus according to claim 1 in which at least one of said end support structures comprises a column mounted generally in the centre of an annular stockpile whereby the bridging girder is lifted, lowered and swung about the vertical axis of said column.

10. Apparatus according to claim 1 in which said means for jointly raising or lowering said scraper means and said girder comprises a lifting device on each of said end supports.

11. Apparatus according to claim 1 in which the scraper means has a length substantially equal to the width of said stockpile base.

12. Apparatus according to claim 1 further comprising a side clearing appliance mounted on said gantry to assist removal of bulk material from the slope of the dump or pile toward which the bulk material is conveyed by said scraper means.

13. Apparatus according to claim 12 in which said side clearing appliance comprises at least one scraper for clearing the said slope.

14. Apparatus according to claim 1 in which said bridging girder lies oblique to the horizontal and in which said bridging girder is raised and lowered in its inclined position.

15. Apparatus according to claim 1 in which said gantry further comprises a device for feeding bulk material into the dump or stockpile.

16. Apparatus according to claim 15 in which said device comprises a filling conveyor and means for adjusting the discharge height of said conveyor.

17. Apparatus according to claim 16 in which said conveyor comprises a supply belt and a distribution and discharge belt, said distribution and discharge belt travelling along the longitudinal axis of said bridging girder and being mounted behind said supply belt relative to the direction in which bulk material is conveyed to the dump or stockpile.

18. Apparatus according to claim 17 further comprising a belt loop trolley having a jib pivotable in the vertical plane and coupled with the bridging girder, the jib carrying the top run of a stationary yard conveyor belt in a loop, and a return and discharge drum being mounted at the free jib end.

19. Apparatus according to claim 1 in which said bridging girder is provided with two scraper means conveying in opposite directions and extending from the middle region of said bridging girder towards the opposite ends thereof.

* * * * *